July 15, 1941.  G. A. WADDLE  2,249,588
CONVEYER
Filed March 7, 1940  2 Sheets-Sheet 1
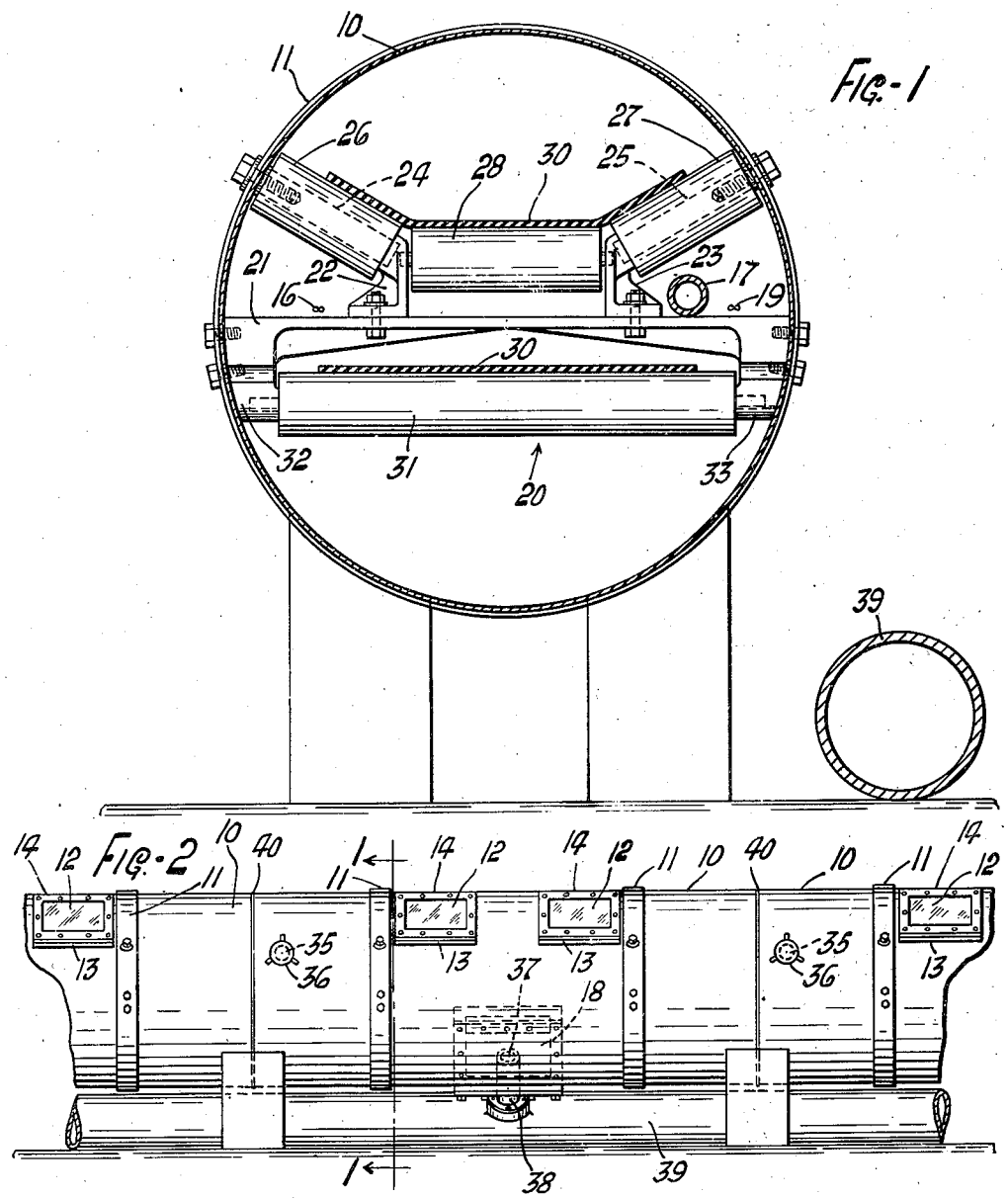
INVENTOR
GEORGE A. WADDLE
BY
ATTORNEYS July 15, 1941.  G. A. WADDLE  2,249,588

CONVEYER

Filed March 7, 1940  2 Sheets-Sheet 2

INVENTOR
GEORGE A. WADDLE

BY

ATTORNEYS

Patented July 15, 1941

2,249,588

UNITED STATES PATENT OFFICE 2,249,588

CONVEYER

George A. Waddle, Akron, Ohio

Application March 7, 1940, Serial No. 322,731

16 Claims. (Cl. 198—204)

This invention relates to conveyers and more particularly to conveyer units which will permit the rapid and economical installation of a conveyer system.

Heretofore, a conveyer system employing endless belts or chains as the conveying element has required an elaborate system of stringers and bents to support the conveyer idler stands in true alignment and with the required rigidity. When such conveyer systems are used to convey materials for long distances, and especially when used over rough terrain, elaborate and expensive trestles have been required heretofore. The installation and maintenance expenses of such trestles have been so great as to prevent the use of conveyers in many situations where conveyers would have been used otherwise, as for example, where it would be desirable to install a conveyer system over navigable streams.

It is an object of this invention to provide a plurality of self-contained units comprising conveyer idler stands in a supporting and enclosing conduit, said units being adapted to be joined to form a complete substantially self-supporting conveyer line. It is an advantage of this invention that a conveyer system may be installed over extremely rough terrain or across navigable water with a minimum installation expense and with a minimum of preliminary grading and foundation expense but with assured alignment of the idler stands.

Another object and advantage of this invention is to provide a conveyer system which may be used without danger of interruption of service under stock piles, in mines, or across terrain which may be subject to landslides or washouts. Another object and advantage of this invention is to provide a conveyor system which may be operated under adverse weather conditions.

A further object of this invention is to provide a conveyer system which requires a minimum of maintenance, and which will eliminate the depredation and theft hazard encountered heretofore on an unpatrolled line over land or in post-offices. A further object of this invention is to provide a conveyer system which may be readily and safely used in overhead installation. A still further object of this invention is to provide a conveyer system which may be used to convey materials which give off noxious gases or gases which tend to attack the material of which the conveyer elements are composed.

Other and further objects and advantages of this invention will be apparent from the following specification, claims, and drawings in which:

Fig. 1 is a cross-section taken along the line 1—1 of Fig. 2;

Fig. 2 is an elevation illustrating a preferred form of this invention;

Figure 3:
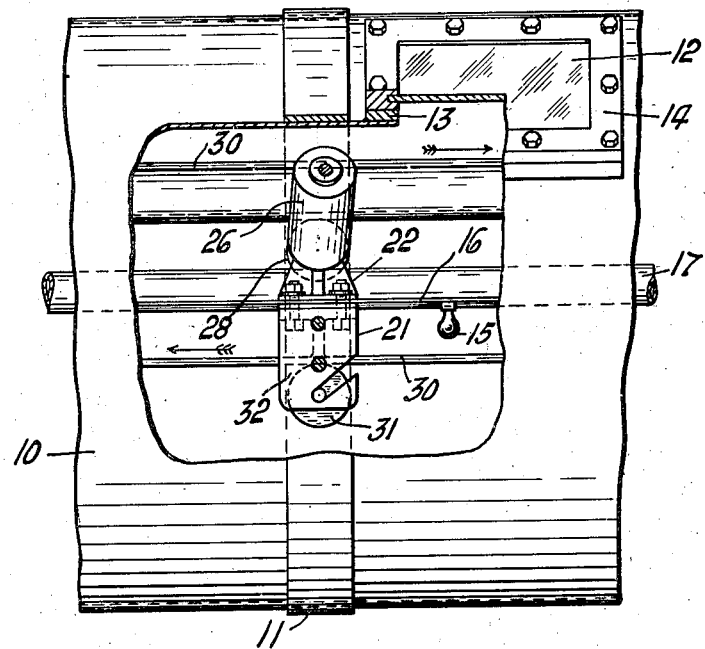
Fig. 3 is a detailed fragmentary view taken from Fig. 2 and showing a portion of the conveyer conduit broken away.

In the drawings, in which like reference characters refer to like parts, 10 represents a length of tubular conduit, preferably of relatively light gauge sheet steel. The conduit 10 may be fabricated from plain or corrugated strip steel, although any other material may be used to form the conduit 10, such as, for example, cast reinforced concrete, vitreous pipe, cast iron, or similar materials. In the embodiment illustrated in Figs. 1 to 3, a load band 11 encircles the conduit 10 and is welded or otherwise secured thereto in order to distribute over the circumference of the conduit 10 the load carried by the enclosed idler roller stand 20.

The idler roller stand 20 is comprised of a cross-beam 21 designed to carry a tension as well as a transverse load. The cross-beam 21 is bolted to the load band 11, and extends across the horizontal diameter of the conduit 10. A pair of brackets 22 and 23 are bolted to the cross-beam 21. The bracket 22 carries an integral trunnion 24 bolted to the load band 11, and the bracket 23 likewise carries a trunnion 25 bolted to the load band 11. Each of the trunnions 24 and 25 carries a troughing idler roller 26 and 27, respectively. A center horizontal idler roller 28 is hung on the brackets 22 and 23 between the troughing rollers 26 and 27 to form a three roll idler stand. As shown in Fig. 1, the axes of the trunnions 24 and 25 are preferably radial, intersecting at the center of conduit 10. As shown in Fig. 3, the axes of the trunnions 24 and 25 are also slightly skewed with respect to the axis of the center roller 28 in the direction of travel of the conveyer belt 30 in order to reduce to a minimum the wear of the belt 30 on the idler stand.

The belt 30, of course, carries the material to be transported by the conveyer system, and is preferably a conventional endless rubber belt. To support the return portion of the belt 30, a return idler roller 31 is hung in the depending brackets 32 and 33 which, as shown in Figs. 1 and 3, are preferably integral with the cross-beam 21. Where the loads carried by the belt 30, and consequently by each idler stand 20 in a conveyer system, are exceptionally heavy, the return idler roller 31 may be omitted from, for example, alternate idler stands where support for the return portion of the belt 30 would be unnecessary. In the preferred form of this invention, all of the idler rollers are provided with sealed bearings containing sufficient lubrication for the life of the roller.

As shown in Fig. 2, two idler stands 20 are bolted to the conduit section 10. The number of idler stands in each conduit section, of course, may be varied depending upon the load to be carried and the length of conduit section which may be conveniently handled. As shown in Figs. 2 and 3, an inspection window 12 is provided adjacent each load band 11. In order to prevent the inspection opening from unduly weakening the conduit 10, a relatively heavy frame 13 is welded to the conduit 10, and the inspection window frame 14 is bolted to the opening frame 13. To permit ready inspection of the condition of the idler stands 20, a light bulb 15 is located adjacent the idler stand, the wiring 16 for the bulb 15 being conveniently supported by the cross-beam 21. For inspection and maintenance purposes, the conduit 10 may also be provided with a telephone line 19 into which an inspector may plug a telephone.

Piping 17 is preferably located within the conduit 10 and may be conveniently supported by the cross-beam 21. When the conveyer system is operating under freezing conditions which would normally prevent the operation of the conveyer due to unwieldability of the load and excessive wear on the belt and idlers, steam may be circulated through the piping 17 in order to maintain the atmosphere within the conduit 10 at an optimum operating temperature. Similarly, when the load or weather conditions are excessively hot, cooling brine may be circulated through the piping 17.

In order to allow for the cleaning out of spillage which will collect in the space below the return idler roller 31, a manhole 18 is provided adjacent the lower portion of the conduit 10. The manhole 18 also permits the removal of an idler stand 20 for inspection and repair. In order to remove an idler stand from the conduit 10, the idler stand is simply unbolted from the load band 11, the return idler roller 31 is removed from the brackets 32 and 33 and the disassembled portions of the stand are removed through the manhole 18.

The embodiment of this invention shown in Fig. 2 is adapted to be ventilated so that materials giving off noxious gases may be conveyed. The intake of ventilating air into the conduit 10 is permitted by the intake port 35 which may be suitably protected by the vent cap 36. Air may be exhausted through the exhaust port 37 which may be conveniently located in the cover of the manhole 18 and connected by the exhaust line 38 to the exhaust main 39. By suitably staggering the intake and exhaust ports 35 and 37, the conduit may be suitably ventilated. Of course, the ventilating system for the conveyer system may be closed by connecting the intake ports 35 to an intake main. Thus, the conveyer may run in a reducing atmosphere or may be ventilated while running under water, if desirable.

If the conveyer system is to be used in a permanent or semi-permanent installation, the conveyer system is preferably installed by welding conduit sections 10 together to form a permanent joint 40. If the installation is to be more or less temporary, the several conduit sections 10 may be provided with flanges or bell and spigot terminals and bolted together. With the several conduit sections 10 united as shown in Fig. 2, a minimum of foundation installations and maintenance is required. The inherent torsion and beam strength of conduit 10 is materially increased by the idler stands 20. When the conduit 10 is under a beam load, it tends to deform in section by increasing in diameter along its horizontal diameter. This tendency is counteracted by the tension which a load on the idler stand places upon the trunnion and cross-beam bolts. Thus, the tendency of the conduit 10 to deflect under load is counteracted by the load on the idler stands. This effect of the load upon the idler stands to maintain the sections of the conduit constant similarly increases the conduit's inherent strength in torsion.

With a plurality of units joined as shown in Fig. 2, a conveyer system may be quickly and economically installed. Because such a conveyer system is substantially self-supporting, the foundations need be no more than amply spaced piers where necessary, and thus the elaborate and continuous trestles used heretofore may be eliminated, especially where the conveyer system must cross small washes and gulches in rough terrain. Because the joined units are substantially water-tight, the joined units may be submerged to carry the conveyer across navigable rivers. Because of the protection afforded by the conduit 10, the joined units will protect the conveyer belt in mines, stock piles, and where the service is subject to interruption due to landslides and floods. Also, the conduits 10 eliminate theft and depredation hazards in post-offices and on unpatrolled lines.

Figure 4:
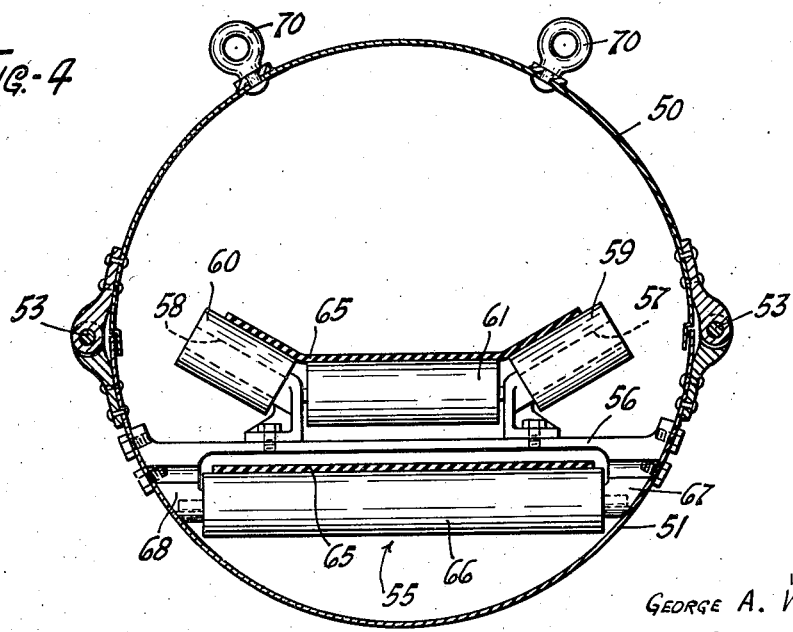
Fig. 4 is a cross-sectional view illustrating a modified form of this invention.

This invention, obviously, is not limited to the embodiment illustrated in Figs. 1 to 3. For example, as shown in Fig. 4, the conduit length may be comprised of an upper half-section 50 and a mating lower half-section 51 secured together by the bolts 53. In the embodiment disclosed in Fig. 4, the idler stand 55 is comprised of a cross-beam 56 bolted to the lower half-section 51. A three-roll idler stand comprised of trunnions 57 and 58, trough rollers 59 and 60 carried thereby, and a center roller 61 hung therebetween is supported by the cross-beam 56. The portion of the conveyer belt 65 which carries the material to be conveyed is supported by the three-roll idler stand. The return portion of the belt is supported by the return idler roller 66 which is hung in the brackets 67 and 68 which depend below the cross-beam 56. In this embodiment the section of the conduit is maintained substantially constant under load by the tension load of the cross-beam 56 on the bolts securing the cross-beam in the half-section 51, and by the tension load on the radially disposed I-members 70 secured in the half-section 50.

The embodiment disclosed in Fig. 4 is especially adapted to overhead suspension. If installed as an overhead conveyer system, only the upper half-section 50 need be articulated. The conduit may then be opened for inspection and repair, after the idler stands have been unbolted, by simply removing the bolts 53 on one side and hinging the lower half-section on the bolts on the other side. Of course, if the embodiment disclosed in Fig. 4 is supported on piers, only the several lower half-sections 51 are joined so that individual upper half-sections 50 may be hinged open for inspection and repair. The embodiment disclosed is particularly adapted for conveyer systems where it may be necessary to convey bulky objects which may extend above the trough line of the conveyer belt, as, for example, packages in post-offices and large lumps of coal in mines.

This invention, therefore, is not limited to the embodiments disclosed, either in whole or in part, but inasmuch as it may be modified and adapted to meet particular conditions, it is limited only by the following claims.

What is claimed is:

1. In a conveyer system, a unit adapted to be joined with similar units to comprise a conveyer system, said unit comprising a conduit having a tubular section, a cross-beam removably secured to said conduit and enclosed therein, a trunnion supported by said cross-beam, an idler roller carried by said trunnion and a return idler roller supported in said conduit, and an endless conveyer supported by said idler roller and said return idler roller.

2. In a conveyer system, a unit adapted to be joined with similar units to comprise a conveyer system, said unit comprising a conduit having a tubular section, a cross-beam removably secured to said conduit and enclosed therein, an idler roller supported by said cross-beam, and a return idler roller supported in said conduit, and an endless conveyer supported by said idler roller and said return idler roller.

3. In a conveyer system, a unit adapted to be joined with similar units to comprise a conveyer system, said unit comprising a conduit having a tubular section, a cross-beam removably secured to said conduit and enclosed therein, a trunnion supported by said cross-beam, an idler roller carried by said trunnion and a return idler roller suspended from said cross-beam, and an endless conveyer supported by said idler roller and said return idler roller, whereby the transverse stresses in said cross-beam tend to counteract the tendency of said conduit to deflect under a transverse load.

4. In a conveyer system, a unit adapted to be joined with similar units to comprise a conveyer system, said unit comprising a conduit having a tubular section, a cross-beam removably secured to said conduit and enclosed therein, an idler roller supported by said cross-beam and a return idler roller suspended from said cross-beam, and an endless conveyer supported by said idler roller and said return idler roller, whereby the transverse stresses in said cross-beam tend to counteract the tendency of said conduit to deflect under a transverse load.

5. In a conveyer system, a plurality of joined conveyer supporting units, each of said units comprising a length of conduit having a tubular section, an idler roller stand within said length of conduit, means for removably securing said stand in said length of conduit in alignment with idler roller stands in adjacent conveyer supporting units, and an endless conveyer supported by said idler roller stands in said plurality of joined conveyer supporting units.

6. In a conveyer system, a plurality of joined conveyer supporting units, each of said units comprising a length of conduit having a tubular section, an idler roller stand within said length of conduit, means for removably securing said stand in said length of conduit in alignment with idler roller stands in adjacent conveyer supporting units, means affording access to the interior of said conduit whereby said stand may be removed from said conduit, and an endless conveyer supported by said idler roller stands in said plurality of joined conveyer supporting units.

7. In a conveyer system, a plurality of joined conveyer supporting units, each of said units comprising a length of conduit having a tubular section, an idler roller stand within said length of conduit, means for removably securing said stand in said length of conduit in alignment with idler roller stands in adjacent conveyer supporting units, means affording access to the interior of said conduit whereby said stand may be removed from said conduit, an endless conveyer supported by said idler roller stands in said plurality of joined conveyer supporting units and means in said conduit adjacent said stand permitting visual inspection of said stand.

8. In a conveyer system, a plurality of joined conveyer supporting units, each of said units comprising a length of conduit having a tubular section, an idler roller stand within said length of conduit, means for removably securing said stand in said length of conduit in alignment with idler roller stands in adjacent conveyer supporting units, means affording access to the interior of said conduit whereby said stand may be removed from said conduit, an endless conveyer supported by said idler roller stands in said plurality of joined conveyer supporting units, and means for maintaining the atmosphere within said units at a temperature different from the temperature of the atmosphere surrounding said units.

9. In a conveyer system, a plurality of joined conveyer supporting units, each of said units comprising a length of conduit having a tubular section, an idler roller stand within said length of conduit, means for removably securing said stand in said length of conduit in alignment with idler roller stands in adjacent conveyer supporting units, means affording access to the interior of said conduit whereby said stand may be removed from said conduit, an endless conveyer supported by said idler roller stands in said plurality of joined conveyer supporting units, and means for ventilating said joined units.

10. In a conveyer system, a plurality of joined conveyer supporting units, each of said units comprising a length of conduit having a tubular section, an idler roller stand within said length of conduit, means for removably securing said stand in said length of conduit in alignment with idler roller stands in adjacent conveyer supporting units, means affording access to the interior of said conduit whereby said stand may be removed from said conduit, an endless conveyer supported by said idler roller stands in said plurality of joined conveyer supporting units, means for maintaining the atmosphere within said units at a temperature different from the temperature of the atmosphere surrounding said units, and means for ventilating said joined units.

11. In a conveyer system, a unit adapted to be joined with similar units to comprise a conveyer system, said unit comprising a conduit having a tubular section, a cross-beam removably secured to said conduit, a pair of trunnions carried by said cross-beam, each of said trunnions being secured to said conduit, idler rollers mounted on said trunnions, a return idler roller removably supported by said cross-beam below said trunnions, and an endless conveyer supported by said idler rollers and said return idler roller.

12. In a conveyer system, a unit adapted to be joined with similar units to comprise a conveyer system, said unit comprising a conduit having a tubular section, means supporting an idler roller transversely of said conduit, means supporting a return idler roller transversely of said conduit, and an endless conveyer supported by said idler roller and said return idler roller.

13. In a conveyer system, a plurality of joined conveyer supporting units, each of said units comprising a length of tubular conduit comprised of an upper section and a lower section, means for removably securing said upper and lower sections to each other, an idler roller stand removably secured within said lower section, whereby said idler roller stand and said lower section reinforce each other against deformation under load, and an endless conveyer supported by said idler stands in said joined conveyer units.

14. In a conveyer system, a plurality of joined conveyer supporting units, each of said units comprising a length of tubular conduit comprised of an upper section and a lower section, means for removably securing said upper and lower sections to each other, an idler roller stand removably secured within said lower section, whereby said idler roller stand and said lower section reinforce each other against deformation under load, and an endless conveyer supported by said idler stands in said joined conveyer units, said upper section of said unit being removable from said lower section to permit inspection and repair of said idler roller stand secured within said lower section.

15. In a conveyer system, a plurality of joined conveyer supporting units, each of said units comprising a length of tubular conduit comprised of an upper section and a lower section, means for removably securing said upper and lower sections to each other, means for supporting said unit mounted on said upper section, an idler roller stand removably secured within said lower section, whereby said idler roller stand and said lower section reinforce each other against deformation under load, and an endless conveyer supported by said idler stands in said joined conveyer units, said lower section being removable from said upper section to permit inspection and repair of said idler roller stand secured within said unit.

16. In a conveyer system, a plurality of joined conveyer supporting units, each of said units comprising a length of tubular conduit comprised of an upper section and a lower section, means for removably securing said upper and lower sections to each other, an idler roller stand removably secured within said lower section, whereby said idler roller stand and said lower section reinforce each other against deformation under load, and an endless conveyer supported by said idler stands in said joined conveyer units, said idler roller stand comprising a cross-beam, an idler roller carried by said cross-beam, and a return idler roller removably supported by said cross-beam to permit said idler roller stand to be removed from said unit without disconnecting said endless conveyer supported by idler roller stands in adjacent units.

GEORGE A. WADDLE.